US012688305B2

(12) United States Patent　　(10) Patent No.: US 12,688,305 B2
Lotze et al.　　(45) Date of Patent: Jul. 21, 2026

(54) RISK ANALYSIS OF A DISTRIBUTED TEST OBJECT

(71) Applicant: VOLKSWAGEN AKTIENGESELLSCHAFT, Wolfsburg (DE)

(72) Inventors: Marcel Lotze, Braunschweig (DE); Jörn Eichler, Berlin (DE); Alexander Tschache, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 18/848,312

(22) PCT Filed: Mar. 22, 2023

(86) PCT No.: PCT/EP2023/057325
§ 371 (c)(1),
(2) Date: Sep. 18, 2024

(87) PCT Pub. No.: WO2023/186655
PCT Pub. Date: Oct. 5, 2023

(65) Prior Publication Data
US 2025/0200191 A1　　Jun. 19, 2025

(30) Foreign Application Priority Data
Mar. 29, 2022　　(DE) ..................... 10 2022 203 086.9

(51) Int. Cl.
G06F 21/57 (2013.01)
G06F 21/55 (2013.01)
(52) U.S. Cl.
CPC .......... G06F 21/577 (2013.01); G06F 21/552 (2013.01); G06F 21/554 (2013.01); G06F 2221/034 (2013.01)

(58) Field of Classification Search
None
See application file for complete search history.

(56) References Cited

U.S. PATENT DOCUMENTS 5,933,498 A * 8/1999 Schneck ................. G06F 21/72
　　　　　　　　　　　　　　　　　705/54
7,739,741 B2 * 6/2010 Saffre ................... G06F 21/552
　　　　　　　　　　　　　　　　　713/153

(Continued)

FOREIGN PATENT DOCUMENTS

WO　　2016077024 A1　　5/2016

OTHER PUBLICATIONS

Wright et al "Improved Mobile Device Security Through Privacy Risk Assessment and Visualization," IEEE Computer Society, pp. 255-258 (Year: 2012).*

(Continued)

*Primary Examiner* — Luu T Pham
*Assistant Examiner* — James J Wilcox
(74) *Attorney, Agent, or Firm* — BARNES & THORNBURG LLP

(57) ABSTRACT

A method, a computer program with instructions, and a system for the risk analysis of a distributed test object. The disclosed embodiment also relates to devices for use in such a system. According to the invention, a risk analysis for a part of the test object located in a first context is carried out. In addition, a risk analysis for a part of the test object located in a second context is carried out. If a protection requirement is determined in the case of one of the risk analyses, information relating to this determined protection requirement is exchanged between the risk analyses. The determined protection requirement can then be taken into account in that a risk-enhancing measure is determined. In this case, (Continued)

information relating to the determined risk-enhancing measure can be exchanged between the risk analyses.

13 Claims, 5 Drawing Sheets

(56) References Cited

U.S. PATENT DOCUMENTS

| | | | | |
|---|---|---|---|---|
| 8,234,641 | B2 * | 7/2012 | Fitzgerald | G06F 21/577 718/1 |
| 8,495,745 | B1 * | 7/2013 | Schrecker | H04L 63/00 726/25 |
| 8,544,098 | B2 * | 9/2013 | Gustave | G06F 21/577 709/224 |
| 8,683,546 | B2 * | 3/2014 | Dunagan | G06F 21/577 726/1 |
| 8,904,538 | B1 * | 12/2014 | Glick | G06F 21/554 726/24 |
| 9,015,842 | B2 * | 4/2015 | Troyansky | G06F 21/577 709/224 |
| 9,219,720 | B1 * | 12/2015 | Satpathy | G06F 21/46 |
| 9,294,497 | B1 * | 3/2016 | Ben-Or | H04L 63/1433 |
| 9,294,498 | B1 * | 3/2016 | Yampolskiy | H04W 84/12 |
| 9,578,063 | B1 * | 2/2017 | Iyer | G06F 9/45558 |
| 9,648,036 | B2 * | 5/2017 | Seiver | H04L 63/1433 |
| 9,697,019 | B1 * | 7/2017 | Fitzgerald | G06F 9/455 |
| 9,697,355 | B1 * | 7/2017 | Park | G06F 21/554 |
| 9,762,582 | B1 * | 9/2017 | Hockings | G06F 21/577 |
| 9,762,599 | B2 * | 9/2017 | Wager | G06F 21/577 |
| 9,830,449 | B1 * | 11/2017 | Wagner | G06F 9/45508 |
| 9,894,045 | B1 * | 2/2018 | Mao | G06F 21/554 |
| 9,973,525 | B1 * | 5/2018 | Roturier | H04L 63/1433 |
| 9,985,983 | B2 * | 5/2018 | Seiver | H04W 84/005 |
| 10,009,375 | B1 * | 6/2018 | Sites | G06N 3/09 |
| 10,075,466 | B1 * | 9/2018 | Oliphant | H04L 63/1416 |
| 10,104,097 | B1 * | 10/2018 | Yumer | H04L 63/20 |
| 10,108,803 | B2 * | 10/2018 | Chari | H04L 63/1433 |
| 10,110,626 | B2 * | 10/2018 | Chantz | H04L 63/1425 |
| 10,140,453 | B1 * | 11/2018 | Fridakis | G06F 21/577 |
| 10,142,794 | B1 * | 11/2018 | Diamanti | H04W 4/029 |
| 10,164,995 | B1 * | 12/2018 | Fang | H04L 63/1433 |
| 10,181,039 | B1 * | 1/2019 | Ranjan | G06F 16/9535 |
| 10,230,749 | B1 * | 3/2019 | Rostami-Hesarsorkh | G06F 21/56 |
| 10,257,225 | B1 * | 4/2019 | Sites | H04L 63/1483 |
| 10,325,093 | B1 * | 6/2019 | Kumar | G06F 21/577 |
| 10,332,211 | B1 * | 6/2019 | Cielocha | G06F 21/31 |
| 10,380,347 | B2 * | 8/2019 | Gorbaty | G06F 21/577 |
| 10,419,222 | B2 * | 9/2019 | Mahaffey | H04L 9/3247 |
| 10,445,516 | B1 * | 10/2019 | Mao | G06F 21/51 |
| 10,467,419 | B1 * | 11/2019 | Youngberg | G06F 21/566 |
| 10,503,899 | B2 * | 12/2019 | Moore | H04L 63/1416 |
| 10,528,741 | B1 * | 1/2020 | Collins | G06F 21/577 |
| 10,540,493 | B1 * | 1/2020 | Kras | G09B 9/00 |
| 10,558,809 | B1 * | 2/2020 | Joyce | G06F 21/577 |
| 10,607,015 | B1 * | 3/2020 | Hecht | G06F 9/54 |
| 10,628,576 | B1 * | 4/2020 | Haq | G06F 21/44 |
| 10,643,002 | B1 * | 5/2020 | Veselov | G06F 21/00 |
| 10,650,150 | B1 * | 5/2020 | Rajasooriya | G06N 7/01 |
| 10,673,886 | B1 * | 6/2020 | Mezic | H04L 63/1425 |
| 10,706,155 | B1 * | 7/2020 | Veselov | G06F 9/45558 |
| 10,715,542 | B1 * | 7/2020 | Wei | G06F 16/958 |
| 10,754,958 | B1 * | 8/2020 | Sidagni | G06F 21/552 |
| 10,754,959 | B1 * | 8/2020 | Rajasooriya | G06N 7/01 |
| 10,817,604 | B1 * | 10/2020 | Kimball | G06F 21/563 |
| 10,820,205 | B1 * | 10/2020 | Opos | G06F 21/577 |
| 10,831,899 | B2 * | 11/2020 | Bezzi | G06N 20/00 |
| 10,893,066 | B1 * | 1/2021 | Oliphant | H04L 63/1441 |
| 10,902,114 | B1 * | 1/2021 | Trost | G06F 16/26 |
| 11,201,890 | B1 * | 12/2021 | Coull | G06F 16/9024 |
| 11,238,163 | B1 * | 2/2022 | Shih | G06F 21/577 |
| 11,290,494 | B2 * | 3/2022 | Li | G06F 21/552 |
| 11,310,258 | B2 * | 4/2022 | Raghuramu | H04L 63/1433 |
| 11,354,752 | B2 * | 6/2022 | Jevtic | G06N 20/20 |
| 11,379,601 | B2 * | 7/2022 | Agarwal | G06F 21/6245 |
| 11,397,808 | B1 * | 7/2022 | Prabhu | G06F 21/566 |
| 11,403,405 | B1 * | 8/2022 | Donovan | G06F 11/3684 |
| 11,409,866 | B1 * | 8/2022 | Dixit | G06F 21/554 |
| 11,444,974 | B1 * | 9/2022 | Shakhzadyan | H04L 63/1466 |
| 11,463,463 | B1 * | 10/2022 | Phung | H04L 63/1425 |
| 11,463,483 | B2 * | 10/2022 | Wadhwa | H04L 63/1433 |
| 11,516,222 | B1 * | 11/2022 | Srinivasan | G06F 21/577 |
| 11,526,614 | B2 * | 12/2022 | Fang | H04L 9/50 |
| 11,636,213 | B1 * | 4/2023 | Elgressy | H04L 63/0263 726/25 |
| 11,640,470 | B1 * | 5/2023 | Amar | G06Q 10/0635 726/22 |
| 11,675,912 | B2 * | 6/2023 | Light | G06F 17/18 726/25 |
| 11,681,811 | B1 * | 6/2023 | Dixit | G06F 8/65 726/25 |
| 11,689,555 | B2 * | 6/2023 | Cai | G06Q 10/0635 726/25 |
| 11,711,374 | B2 * | 7/2023 | Ross | G06F 21/604 726/28 |
| 11,720,679 | B2 * | 8/2023 | Light | G06F 21/57 726/22 |
| 11,720,686 | B1 * | 8/2023 | Cross | G06F 9/455 726/25 |
| 11,750,657 | B2 * | 9/2023 | Hadar | G06F 21/577 |
| 11,777,992 | B1 * | 10/2023 | Cross | H04L 63/0876 726/5 |
| 11,783,052 | B2 * | 10/2023 | Light | H04L 63/1433 726/25 |
| 11,783,062 | B2 * | 10/2023 | Lounsberry | G06F 21/6218 726/30 |
| 11,790,081 | B2 * | 10/2023 | D'Amato | H04L 63/1466 700/28 |
| 11,863,580 | B2 * | 1/2024 | Ross | G06F 21/577 |
| 11,895,150 | B2 * | 2/2024 | Engelberg | H04L 63/20 |
| 11,954,208 | B1 * | 4/2024 | Grass | G06F 21/76 |
| 11,973,788 | B2 * | 4/2024 | Kuppa | H04L 63/145 |
| 11,973,790 | B2 * | 4/2024 | Klein | H04L 63/1433 |
| 12,050,693 | B2 * | 7/2024 | Wang | G06F 21/316 |
| 12,086,254 | B2 * | 9/2024 | Webster | G06F 21/57 |
| 12,135,788 | B1 * | 11/2024 | Sreekanta | G06F 21/57 |
| 12,265,611 | B2 * | 4/2025 | Shachar | G06N 3/08 |
| 12,547,727 | B1 * | 2/2026 | Kulkarni | G06F 21/577 |
| 12,591,684 | B2 * | 3/2026 | Hecht | G06F 21/577 |
| 2003/0172294 | A1 * | 9/2003 | Judge | H04L 63/0245 726/13 |
| 2005/0038881 | A1 * | 2/2005 | Ben-Itzhak | H04L 63/20 709/223 |
| 2005/0066195 | A1 * | 3/2005 | Jones | G06F 21/577 726/4 |
| 2006/0020814 | A1 * | 1/2006 | Lieblich | G06F 21/577 713/182 |
| 2006/0178997 | A1 * | 8/2006 | Schneck | G06F 21/86 705/50 |
| 2006/0272011 | A1 * | 11/2006 | Ide | H04L 63/1433 726/5 |
| 2007/0094491 | A1 * | 4/2007 | Teo | G06F 21/577 713/153 |
| 2007/0180490 | A1 * | 8/2007 | Renzi | G06F 21/604 726/1 |
| 2008/0047016 | A1 * | 2/2008 | Spoonamore | G06Q 10/06 726/25 |
| 2008/0047017 | A1 * | 2/2008 | Renaud | G06F 21/46 705/14.69 |
| 2008/0195407 | A1 * | 8/2008 | Hurley | G06Q 40/00 705/1.1 |
| 2009/0249465 | A1 * | 10/2009 | Touboul | H04W 12/12 726/11 |
| 2010/0218256 | A1 * | 8/2010 | Thomas | G06F 21/577 726/25 |
| 2010/0250476 | A1 | 9/2010 | Khoury et al. | |
| 2010/0306852 | A1 * | 12/2010 | Adar | G06Q 10/06 726/25 |
| 2011/0126111 | A1 * | 5/2011 | Gill | G06F 21/577 715/736 |

(56) References Cited

U.S. PATENT DOCUMENTS

| | | | |
|---|---|---|---|
| 2011/0154497 A1* | 6/2011 | Bailey, Jr. | H04L 63/1433 726/25 |
| 2011/0219448 A1* | 9/2011 | Sreedharan | H04L 67/02 715/234 |
| 2011/0247069 A1* | 10/2011 | Slater | G06F 21/577 726/22 |
| 2011/0265162 A1* | 10/2011 | Alavandar | G06F 21/577 726/7 |
| 2012/0216243 A1* | 8/2012 | Gill | G06F 21/55 726/1 |
| 2012/0224057 A1* | 9/2012 | Gill | G06F 21/577 348/143 |
| 2013/0097711 A1* | 4/2013 | Basavapatna | G06F 21/577 726/25 |
| 2013/0191919 A1* | 7/2013 | Basavapatna | H04L 63/20 726/25 |
| 2013/0246320 A1* | 9/2013 | Fredericksen | H04L 63/1433 706/14 |
| 2013/0347094 A1* | 12/2013 | Bettini | H04L 63/1433 726/11 |
| 2014/0090071 A1* | 3/2014 | Salehie | G06F 21/55 726/25 |
| 2014/0137257 A1* | 5/2014 | Martinez | H04L 63/1433 726/25 |
| 2014/0173739 A1* | 6/2014 | Ahuja | G06F 21/577 726/25 |
| 2014/0189873 A1* | 7/2014 | Elder | H04L 63/1433 726/25 |
| 2014/0325670 A1* | 10/2014 | Singh | G06Q 50/184 726/26 |
| 2015/0143482 A1* | 5/2015 | Barkan | G06F 21/32 726/22 |
| 2015/0193524 A1* | 7/2015 | Williams | G06F 21/577 707/740 |
| 2015/0269383 A1* | 9/2015 | Lang | G06F 21/57 726/1 |
| 2015/0365437 A1* | 12/2015 | Bell, Jr. | G06F 21/54 726/1 |
| 2016/0099963 A1* | 4/2016 | Mahaffey | H04L 63/166 726/25 |
| 2016/0112451 A1* | 4/2016 | Jevans | G06F 21/56 726/25 |
| 2016/0127367 A1* | 5/2016 | Jevans | G06F 21/64 713/152 |
| 2016/0246966 A1* | 8/2016 | Batrouni | G06F 21/577 |
| 2016/0248590 A1* | 8/2016 | Benson | G06F 21/57 |
| 2016/0344772 A1* | 11/2016 | Monahan | G06F 16/248 |
| 2016/0364727 A1* | 12/2016 | DeLawter | G06Q 20/389 |
| 2017/0032143 A1* | 2/2017 | Kong | G06F 21/6263 |
| 2017/0155676 A1* | 6/2017 | Tamir | H04L 63/1433 |
| 2017/0169230 A1* | 6/2017 | Zheng | G06N 20/00 |
| 2017/0235955 A1* | 8/2017 | Barkan | H04L 63/0853 726/11 |
| 2017/0251002 A1* | 8/2017 | Rostamabadi | G06F 21/566 |
| 2017/0251003 A1* | 8/2017 | Rostami-Hesarsorkh | G06N 5/01 |
| 2017/0300690 A1* | 10/2017 | Ladnai | G06F 21/554 |
| 2017/0346853 A1* | 11/2017 | Wyatt | H04L 43/12 |
| 2017/0357810 A1* | 12/2017 | Gorbaty | G06F 16/22 |
| 2018/0025160 A1* | 1/2018 | Hwang | G06F 8/71 726/25 |
| 2018/0046796 A1* | 2/2018 | Wright | G06F 21/45 |
| 2018/0060587 A1* | 3/2018 | Chen | G06F 21/316 |
| 2018/0060591 A1* | 3/2018 | Dobrila | G06F 21/577 |
| 2018/0063181 A1* | 3/2018 | Jones | G06F 21/577 |
| 2018/0063182 A1* | 3/2018 | Jones | H04L 63/1433 |
| 2018/0068241 A1* | 3/2018 | Varkey | G06Q 10/0635 |
| 2018/0121657 A1* | 5/2018 | Hay | G06F 21/51 |
| 2018/0124114 A1* | 5/2018 | Woods | G06F 21/577 |
| 2018/0137279 A1* | 5/2018 | Peyton, Jr. | G06F 21/577 |
| 2018/0144139 A1* | 5/2018 | Cheng | G06F 21/577 |
| 2018/0159889 A1* | 6/2018 | Sjouwerman | G06F 21/56 |
| 2018/0167402 A1* | 6/2018 | Scheidler | G06N 20/00 |
| 2018/0173580 A1* | 6/2018 | Pavlas | G06F 21/554 |
| 2018/0189484 A1* | 7/2018 | Danahy | G06N 20/00 |
| 2018/0288087 A1* | 10/2018 | Hittel | H04L 63/145 |
| 2018/0295518 A1* | 10/2018 | Alloche | H04L 9/3268 |
| 2018/0309780 A1* | 10/2018 | Damodaran | G06F 21/566 |
| 2018/0314833 A1* | 11/2018 | Vittal | G06Q 10/0635 |
| 2018/0336351 A1* | 11/2018 | Jeffries | G06F 21/53 |
| 2018/0357415 A1* | 12/2018 | Dhondse | B25J 9/163 |
| 2018/0357419 A1* | 12/2018 | Lee | G06F 21/57 |
| 2018/0357422 A1* | 12/2018 | Telang | G06F 21/577 |
| 2018/0359237 A1* | 12/2018 | Shem Tov | G06F 21/577 |
| 2018/0375886 A1* | 12/2018 | Kirti | H04L 63/1425 |
| 2019/0026474 A1* | 1/2019 | Adam | G06F 21/563 |
| 2019/0036971 A1* | 1/2019 | Ford | G06F 11/3438 |
| 2019/0042736 A1* | 2/2019 | Krebs | H04L 63/1491 |
| 2019/0044978 A1* | 2/2019 | Barday | G06F 21/577 |
| 2019/0050561 A1* | 2/2019 | Li | G06F 21/552 |
| 2019/0050595 A1* | 2/2019 | Barday | G06Q 10/107 |
| 2019/0050596 A1* | 2/2019 | Barday | H04L 63/1433 |
| 2019/0050766 A1* | 2/2019 | Barday | H04W 12/02 |
| 2019/0095320 A1* | 3/2019 | Biswas | G06F 11/3457 |
| 2019/0098028 A1* | 3/2019 | Ektare | H04L 43/10 |
| 2019/0102548 A1* | 4/2019 | Bulut | G06F 21/568 |
| 2019/0114437 A1* | 4/2019 | Kim | G06F 21/577 |
| 2019/0129705 A1* | 5/2019 | Bulut | G06F 21/577 |
| 2019/0132350 A1* | 5/2019 | Smith | G06F 21/60 |
| 2019/0132351 A1* | 5/2019 | Linde | G06F 21/577 |
| 2019/0147538 A1 | 5/2019 | Duan et al. | |
| 2019/0171822 A1* | 6/2019 | Sjouwerman | H04L 63/1433 |
| 2019/0171823 A1* | 6/2019 | Maluf | G06F 21/577 |
| 2019/0173914 A1* | 6/2019 | Irimie | H04L 63/1433 |
| 2019/0173916 A1* | 6/2019 | Irimie | G06F 21/552 |
| 2019/0173917 A1* | 6/2019 | Sites | G06V 10/82 |
| 2019/0173919 A1* | 6/2019 | Irimie | G06N 3/09 |
| 2019/0179799 A1* | 6/2019 | Barday | H04L 67/568 |
| 2019/0180050 A1* | 6/2019 | Barday | H04L 67/1097 |
| 2019/0180052 A1* | 6/2019 | Barday | H04L 67/51 |
| 2019/0180054 A1* | 6/2019 | Barday | H04L 63/108 |
| 2019/0182289 A1* | 6/2019 | White | G06F 21/6245 |
| 2019/0188389 A1* | 6/2019 | Peled | H04L 63/20 |
| 2019/0188390 A1* | 6/2019 | Gunn | G06N 5/025 |
| 2019/0188391 A1* | 6/2019 | Margalit | G06F 21/577 |
| 2019/0199759 A1* | 6/2019 | Anderson | H04L 67/60 |
| 2019/0213332 A1* | 7/2019 | Mccoy | G06F 21/6245 |
| 2019/0222597 A1* | 7/2019 | Crabtree | H04L 63/1425 |
| 2019/0236695 A1* | 8/2019 | McKenna | G06N 20/00 |
| 2019/0251265 A1* | 8/2019 | Ploucha | G06F 21/577 |
| 2019/0266529 A1* | 8/2019 | Barday | G06F 21/6245 |
| 2019/0268381 A1* | 8/2019 | Narayanaswamy | H04L 63/12 |
| 2019/0318100 A1* | 10/2019 | Bhatia | G06F 21/554 |
| 2019/0319987 A1* | 10/2019 | Levy | G06F 21/45 |
| 2019/0334934 A1* | 10/2019 | Teshome | H04W 12/106 |
| 2019/0334947 A1* | 10/2019 | Govardhan | G06F 16/951 |
| 2020/0004936 A1* | 1/2020 | Avital | G06F 21/31 |
| 2020/0004968 A1* | 1/2020 | Brannon | G06F 21/577 |
| 2020/0012796 A1* | 1/2020 | Trepagnier | G06F 18/254 |
| 2020/0028857 A1* | 1/2020 | Warmenhoven | H04L 63/1425 |
| 2020/0034538 A1* | 1/2020 | Woodward | G06F 21/566 |
| 2020/0057850 A1* | 2/2020 | Kraus | G06N 3/09 |
| 2020/0065498 A1* | 2/2020 | Wang | G06F 21/577 |
| 2020/0104491 A1* | 4/2020 | Boulton | G06F 21/577 |
| 2020/0104492 A1* | 4/2020 | Boulton | G06F 8/77 |
| 2020/0128034 A1* | 4/2020 | Boulton | H04L 63/1408 |
| 2020/0128036 A1* | 4/2020 | Sarzynski | G06F 21/6254 |
| 2020/0137125 A1* | 4/2020 | Patnala | H04L 63/302 |
| 2020/0143060 A1* | 5/2020 | Tineo | G06F 21/577 |
| 2020/0159933 A1* | 5/2020 | Ciano | G06F 21/577 |
| 2020/0167705 A1* | 5/2020 | Risoldi | G06F 21/554 |
| 2020/0175173 A1* | 6/2020 | Krishnamoorthy | G06F 21/577 |
| 2020/0177615 A1* | 6/2020 | Grabois | H04L 63/20 |
| 2020/0177617 A1* | 6/2020 | Hadar | G06F 21/552 |
| 2020/0177618 A1* | 6/2020 | Hassanzadeh | G06F 21/552 |
| 2020/0177619 A1* | 6/2020 | Hadar | H04L 43/026 |
| 2020/0202269 A1* | 6/2020 | Brannon | G06F 21/577 |
| 2020/0202270 A1* | 6/2020 | Brannon | G06Q 10/067 |
| 2020/0202271 A1* | 6/2020 | Brannon | G06F 21/552 |
| 2020/0210916 A1* | 7/2020 | Brannon | G06Q 10/067 |
| 2020/0218968 A1* | 7/2020 | Gliozzo | G06N 3/0499 |
| 2020/0220901 A1* | 7/2020 | Barday | G06F 21/552 |

(56) References Cited

U.S. PATENT DOCUMENTS

| | | | |
|---|---|---|---|
| 2020/0226298 A1* | 7/2020 | Appleboum | G06F 21/552 |
| 2020/0236122 A1* | 7/2020 | Ott | H04L 63/1408 |
| 2020/0242254 A1* | 7/2020 | Velur | G06F 21/577 |
| 2020/0244693 A1* | 7/2020 | Ghorbani | H04L 63/1433 |
| 2020/0252422 A1* | 8/2020 | Davis | H04L 63/102 |
| 2020/0257782 A1* | 8/2020 | Brannon | G06F 11/3438 |
| 2020/0257811 A1* | 8/2020 | Tatarinov | G06F 11/3684 |
| 2020/0265134 A1* | 8/2020 | Cristina | G06F 21/54 |
| 2020/0285752 A1* | 9/2020 | Wyatt | G06F 21/566 |
| 2020/0287940 A1* | 9/2020 | Brannon | G06F 16/9537 |
| 2020/0288306 A1* | 9/2020 | Do | H04W 12/37 |
| 2020/0311233 A1* | 10/2020 | Brannon | G06F 21/316 |
| 2020/0311630 A1* | 10/2020 | Risoldi | G06F 30/20 |
| 2020/0311631 A1* | 10/2020 | Hecht | G06Q 10/063114 |
| 2020/0314147 A1* | 10/2020 | Brannon | G06F 16/904 |
| 2020/0320208 A1* | 10/2020 | Bhosale | G06F 21/577 |
| 2020/0320215 A1* | 10/2020 | Bhosale | G06F 11/1461 |
| 2020/0322387 A1* | 10/2020 | Brannon | G06F 16/9038 |
| 2020/0327222 A1* | 10/2020 | Chhabra | H04L 63/0421 |
| 2020/0327223 A1* | 10/2020 | Sanchez | G06F 21/554 |
| 2020/0334355 A1* | 10/2020 | Klein | G06F 21/62 |
| 2020/0351298 A1* | 11/2020 | Paturi | G06Q 10/06 |
| 2020/0356678 A1* | 11/2020 | Gourisetti | G06F 21/577 |
| 2020/0380160 A1* | 12/2020 | Kraus | G06F 21/577 |
| 2020/0401696 A1* | 12/2020 | Ringlein | G06N 3/08 |
| 2021/0014265 A1* | 1/2021 | Hadar | H04L 63/1433 |
| 2021/0042421 A1* | 2/2021 | Li | H04L 9/50 |
| 2021/0049527 A1* | 2/2021 | Beaumont | G06Q 50/265 |
| 2021/0051067 A1* | 2/2021 | Barkovic | G06Q 50/184 |
| 2021/0064759 A1* | 3/2021 | Lomonaco | H04L 67/12 |
| 2021/0084077 A1* | 3/2021 | Brannon | H04L 63/20 |
| 2021/0089978 A1* | 3/2021 | Girdhar | G06Q 30/018 |
| 2021/0110319 A1* | 4/2021 | Gourisetti | G06Q 10/0637 |
| 2021/0112077 A1* | 4/2021 | Huston, III | G06F 21/566 |
| 2021/0120023 A1* | 4/2021 | Gupta | H04L 63/1425 |
| 2021/0142239 A1* | 5/2021 | Brannon | G06Q 10/0635 |
| 2021/0150056 A1* | 5/2021 | Vax | G06F 16/285 |
| 2021/0152555 A1* | 5/2021 | Djosic | G06N 20/00 |
| 2021/0158238 A1* | 5/2021 | Clearwater | G06F 21/6245 |
| 2021/0173711 A1* | 6/2021 | Crabtree | G06F 16/9024 |
| 2021/0173938 A1* | 6/2021 | Doenhoff | G06F 8/65 |
| 2021/0182750 A1* | 6/2021 | Brannon | G06F 21/577 |
| 2021/0194924 A1* | 6/2021 | Heinemeyer | G06F 21/577 |
| 2021/0200840 A1* | 7/2021 | Kannan | G06F 8/73 |
| 2021/0226983 A1* | 7/2021 | Cunningham | H04L 63/20 |
| 2021/0232680 A1* | 7/2021 | Hecht | G06F 21/577 |
| 2021/0240823 A1* | 8/2021 | Margalit | G06F 21/556 |
| 2021/0258151 A1* | 8/2021 | Cristina | G06F 21/602 |
| 2021/0264038 A1* | 8/2021 | Butchko | H04L 63/1433 |
| 2021/0272031 A1* | 9/2021 | Brannon | G06F 21/552 |
| 2021/0273960 A1* | 9/2021 | Humphrey | G06N 7/01 |
| 2021/0273978 A1* | 9/2021 | Hadar | G06F 21/577 |
| 2021/0279303 A1* | 9/2021 | Jang | G06F 21/563 |
| 2021/0303512 A1* | 9/2021 | Barday | G06F 21/577 |
| 2021/0303695 A1* | 9/2021 | Grosse | G06F 17/18 |
| 2021/0312041 A1* | 10/2021 | Gururajan | G06F 21/554 |
| 2021/0312353 A1* | 10/2021 | Brannon | G06Q 10/0635 |
| 2021/0314364 A1* | 10/2021 | Brannon | G06N 20/00 |
| 2021/0326226 A1* | 10/2021 | Hicks | G06F 11/26 |
| 2021/0334373 A1* | 10/2021 | Yanamadala | G06N 20/20 |
| 2021/0336996 A1* | 10/2021 | Brannon | G06F 21/6245 |
| 2021/0342441 A1* | 11/2021 | Ross | G06F 21/316 |
| 2021/0342759 A1* | 11/2021 | Beaumont | G06Q 10/0635 |
| 2021/0377217 A1* | 12/2021 | Antoche Albisor | G06F 21/577 |
| 2021/0382949 A1* | 12/2021 | Yastrebenetsky | G06F 16/951 |
| 2021/0383294 A1* | 12/2021 | Brannon | G06F 15/76 |
| 2021/0390470 A1* | 12/2021 | Clearwater | G06Q 10/0635 |
| 2021/0397717 A1* | 12/2021 | Shwartz | G06Q 10/0635 |
| 2021/0400071 A1* | 12/2021 | Ray | G06F 21/6245 |
| 2021/0406365 A1* | 12/2021 | Neil | G06F 21/554 |
| 2021/0406367 A1* | 12/2021 | Oka | G06F 21/554 |
| 2022/0006818 A1* | 1/2022 | Cunningham | H04L 63/205 |
| 2022/0014534 A1* | 1/2022 | Basovskiy | H04L 63/1433 |
| 2022/0019605 A1* | 1/2022 | Malhotra | G06N 7/01 |
| 2022/0019676 A1* | 1/2022 | Guo | G06F 21/577 |
| 2022/0027479 A1* | 1/2022 | Brannon | H04L 63/20 |
| 2022/0035927 A1* | 2/2022 | Lysecky | G06F 21/566 |
| 2022/0035929 A1* | 2/2022 | Hicks | G06F 11/3692 |
| 2022/0083934 A1* | 3/2022 | Brannon | G06Q 10/067 |
| 2022/0092495 A1* | 3/2022 | Brannon | G06F 21/6245 |
| 2022/0094705 A1* | 3/2022 | Tineo | H04L 63/1441 |
| 2022/0103588 A1* | 3/2022 | Shaw | H04W 72/51 |
| 2022/0108010 A1* | 4/2022 | Bishop, III | G06F 8/436 |
| 2022/0114106 A1* | 4/2022 | Lyons | G06F 12/08 |
| 2022/0114252 A1* | 4/2022 | Syed | G06F 21/554 |
| 2022/0129564 A1* | 4/2022 | Hecht | G06F 21/53 |
| 2022/0131890 A1* | 4/2022 | Shukla | H04L 63/1416 |
| 2022/0138327 A1* | 5/2022 | Panicker | G06F 21/577 |
| | | | 726/25 |
| 2022/0141257 A1* | 5/2022 | Brannon | G06F 16/9537 |
| | | | 726/1 |
| 2022/0147622 A1* | 5/2022 | Chesla | G06N 7/01 |
| 2022/0147623 A1* | 5/2022 | Hirobe | G06F 21/577 |
| 2022/0150270 A1* | 5/2022 | Klein | G06F 11/3457 |
| 2022/0155747 A1* | 5/2022 | Hirobe | G06F 21/71 |
| 2022/0156372 A1* | 5/2022 | Harang | H04L 63/145 |
| 2022/0156657 A1* | 5/2022 | Brannon | G06Q 10/067 |
| 2022/0164475 A1* | 5/2022 | Barday | H04L 63/1433 |
| 2022/0164476 A1* | 5/2022 | Barday | H04L 63/0407 |
| 2022/0188411 A1* | 6/2022 | Lee | H04L 63/1416 |
| 2022/0198010 A1* | 6/2022 | Ladnai | G06F 21/56 |
| 2022/0201045 A1* | 6/2022 | Brannon | G06N 20/00 |
| 2022/0207140 A1* | 6/2022 | Mooney, III | G06F 21/577 |
| 2022/0210196 A1* | 6/2022 | Parekh | H04L 63/0227 |
| 2022/0210200 A1* | 6/2022 | Crabtree | H04L 63/1425 |
| 2022/0247769 A1* | 8/2022 | Erlingsson | G06F 9/5072 |
| 2022/0253531 A1* | 8/2022 | Kim | G06F 11/323 |
| 2022/0269817 A1* | 8/2022 | Nalluri | H04L 63/1441 |
| 2022/0272117 A1* | 8/2022 | Maheve | H04L 63/1416 |
| 2022/0277084 A1* | 9/2022 | Yang | G06F 21/608 |
| 2022/0278993 A1* | 9/2022 | Korakin | H04L 63/20 |
| 2022/0292186 A1* | 9/2022 | Givental | G06F 21/554 |
| 2022/0294818 A1* | 9/2022 | Parekh | G06F 21/602 |
| 2022/0327216 A1* | 10/2022 | Chin | G06F 21/577 |
| 2022/0366055 A1* | 11/2022 | Malvankar | G06N 3/045 |
| 2022/0374218 A1* | 11/2022 | Monteiro Vieira | G06F 8/63 |
| 2022/0377093 A1* | 11/2022 | Crabtree | H04L 43/045 |
| 2023/0021414 A1* | 1/2023 | Kumar | G06F 21/566 |
| 2023/0035522 A1* | 2/2023 | Nadgowda | H04L 63/0876 |
| 2023/0071264 A1* | 3/2023 | Hakala | G06F 21/566 |
| 2023/0153150 A1* | 5/2023 | Kozlowski | H04L 63/20 |
| | | | 718/108 |
| 2023/0153425 A1* | 5/2023 | Yuceer | H04L 63/1425 |
| | | | 726/23 |
| 2023/0171270 A1* | 6/2023 | Venugopal | H04L 63/145 |
| | | | 726/22 |
| 2023/0208870 A1* | 6/2023 | Yellapragada | H04L 63/20 |
| | | | 726/22 |
| 2023/0275908 A1* | 8/2023 | Mace | G06F 21/554 |
| | | | 726/23 |
| 2023/0306110 A1* | 9/2023 | Kashani | G06F 21/56 |
| 2023/0325511 A1* | 10/2023 | Jaster | G06Q 20/065 |
| | | | 726/23 |
| 2024/0160746 A1* | 5/2024 | Kamimura | G06F 21/577 |

OTHER PUBLICATIONS

Papp et al Embedded Systems Security: Threats, Vulnerabilities, and Attack Taxonomy, IEEE, pp. 145-152 (Year: 2015).*

Bolovinou et al "TARA+: Controllability-Aware Threat Analysis and Risk Assessment for L3 Automated Driving Systems," IEEE, pp. 8-13 (Year: 2019).*

Deng et al "Comprehensive Information Security Risk Assessment Model for Transportation Industry," IEEE, pp. 107-110 (Year: 2021).*

Chivers et al.; Information Modeling for Automated Risk Analysis; Department of Information Systems, Cranfield University; www.hrchivers@iee.org; Jan. 1, 2006; pp. 228-239; Defence Academy of the United Kingdom, Shrivenham, Swindon, SN6 8LA, Uk.

Neumann et al; Pseudonymmization risk analysis in distributed systems; Journal of Internet Services and Applications; Jan. 8, 2019; pp. 1-16; vol. 10, No. 1; London, UK.

(56)         References Cited

OTHER PUBLICATIONS

Search Report; International Patent Application No. PCT/EP2023/
057325; Jun. 28, 2023.

* cited by examiner

TRANSPORT
50: R₁

ANAL.
RESULT

ASC.
PROT. REQ.

RISK
ANAL.

BM₁

MF   AE   SBF   UG   MV₁

UNECE

UNECE   STIP.
MEAS.         TEST   UNECE

AM₁

40

M   SB   D

BM₂   40'

BSI

BSI   STIP.
MEAS.         TEST   BSI

AM₂

MF   AE   SBF   UG   MV₂

ANAL.
RESULT

ASC.
PROT. REQ.

60: R₂

BACKEND: RISK
ANAL.

UG
TEST

1

RISK ANALYSIS OF A DISTRIBUTED TEST OBJECT

PRIORITY CLAIM

This patent application is a U.S. National Phase of International Patent Application No. PCT/EP2023/057325, filed 22 Mar. 2023, which claims priority to German Patent Application No. 10 2022 203 086.9, filed 29 Mar. 2022, the disclosures of which are incorporated herein by reference in their entireties.

SUMMARY

Illustrative embodiments relate to a method, a computer program containing instructions and a system for risk analysis of a distributed test object. The disclosed embodiment furthermore relates to devices for use in such a system.

BRIEF DESCRIPTION OF THE DRAWINGS

Exemplary embodiments are described below with reference to drawings, in which.

DETAILED DESCRIPTION

Figure 1:
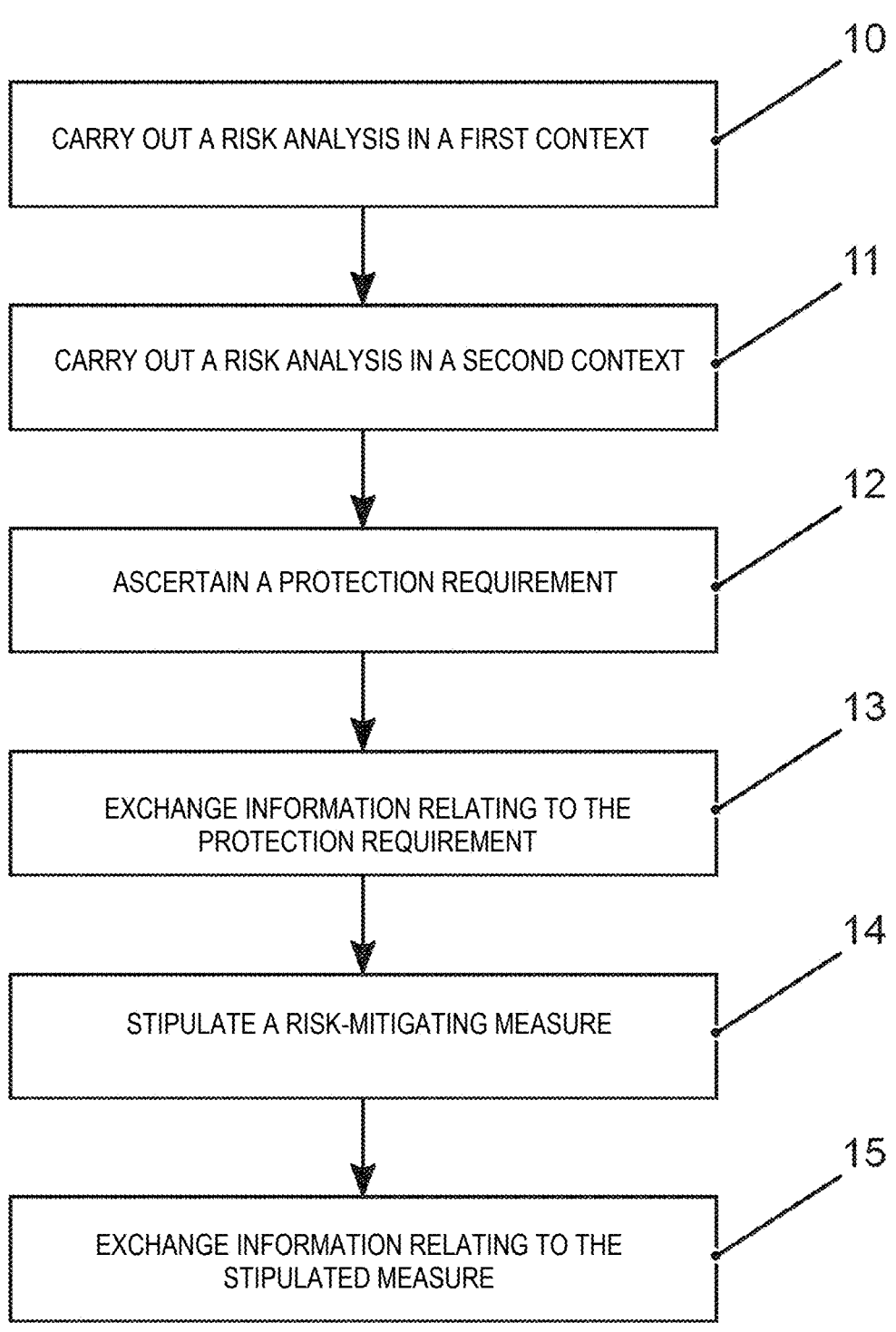
FIG. 1 schematically shows a method for risk analysis of a distributed test object.

A test object for a risk analysis in respect of cyber security, e.g., a distributed function, can have portions in different analysis contexts. The analysis contexts may be, by way of example, an embedded system, a backend or IT system or a mobile device. A risk analysis for the part of the test object that is located in a context is carried out in a defined analysis context. The analysis context can be delineated by various properties, e.g., a distinct policy or a distinct analysis method, and a distinct specification for modelling the test object.

Against this background, US 2010/0250476 A1 describes a method for assessing a risk of conflict between a number of security solutions that are to be integrated. A number of fragmentary security solutions are received in a computer system. A set of the received fragmentary security solutions is integrated to form a combined security solution to meet a number of security requirements. The risk of a conflict between the fragmentary security solutions to be integrated is assessed.

The tool CAIRIS is an open source platform for installing, specifying and validating secure and usable systems. CAIRIS supports the concept of environments and, therefore, permits the modelling of usage contexts.

There is currently no technical solution allowing consideration of distributed test objects in different contexts. Either a holistic risk analysis, which does not allow dedicated assumptions about the context of a part of the test object, is carried out or multiple analyses, which make reciprocal assumptions, are carried out. The ability to compose risk analyses of a distributed test object in different contexts is not known.

A holistic analysis requires a uniform policy, a uniform analysis method and uniform modelling of the distributed parts of the test object. Separate analyses require assumptions about the different parts of the test object to be transmitted manually.

It would, therefore, be desirable to have a tool for carrying out risk analyses available that can be used firstly for carrying out analyses of function portions in different contexts and secondly for linking over different contexts for the holistic consideration of distributed functions.

The disclosed embodiments provide improved solutions for risk analysis of a distributed test object.

According to a first feature of the disclosed embodiments, a method for risk analysis of a distributed test object comprises the operations of: carrying out a semi-automated or fully automated risk analysis for a part of the test object that is located in a first context in a first analysis context, the first analysis context being delineated by a distinct assessment model or a distinct analysis method and a distinct specification for modelling the test object; carrying out a semi-automated or fully automated risk analysis for a part of the test object that is located in a second context in a second analysis context, the second analysis context being delineated by a distinct assessment model or a distinct analysis method and a distinct specification for modelling the test object; and exchanging information relating to an ascertained protection requirement between the risk analyses, a transmission path of a datum for which a protection requirement was ascertained being taken as a basis for automatically determining the further risk analysis during which the protection requirement is meant to be taken into account.

According to another feature of the disclosed embodiment, a computer program comprises instructions that, when executed by a computer, cause the computer to carry out the following operations for risk analysis of a distributed test object: carrying out a semi-automated or fully automated risk analysis for a part of the test object that is located in a first context in a first analysis context, the first analysis context being delineated by a distinct assessment model or a distinct analysis method and a distinct specification for modelling the test object; carrying out a semi-automated or fully automated risk analysis for a part of the test object that is located in a second context in a second analysis context, the second analysis context being delineated by a distinct assessment model or a distinct analysis method and a distinct specification for modelling the test object; and exchanging information relating to an ascertained protection requirement between the risk analyses, a transmission path of a datum for which a protection requirement was ascertained being taken as a basis for automatically determining the further risk analysis during which the protection requirement is meant to be taken into account.

The term computer should be understood broadly in the case. In particular, it also encompasses workstations, distributed systems and other processor-based data processing devices.

The computer program can be provided for electronic retrieval, for example, or may be stored on a computer-readable storage medium.

According to another feature of the disclosed embodiment, a system for risk analysis of a distributed test object has: a first analysis module for carrying out a semi-automated or fully automated risk analysis for a part of the test object that is located in a first context in a first analysis context, the first analysis context being delineated by a distinct assessment model or a distinct analysis method and a distinct specification for modelling the test object; and a second analysis module for carrying out a semi-automated or fully automated risk analysis for a part of the test object that is located in a second context in a second analysis context, the second analysis context being delineated by a distinct assessment model or a distinct analysis method and a distinct specification for modelling the test object; the first analysis module and the second analysis module being designed to exchange information relating to an ascertained protection requirement, a transmission path of a datum for which a protection requirement was ascertained being taken as a basis for automatically determining the further risk analysis during which the protection requirement is meant to be taken into account.

A first device for use in a system has a first analysis module for carrying out a semi-automated or fully automated risk analysis for a part of a test object that is located in a first context in a first analysis context, the first analysis context being delineated by a distinct assessment model or a distinct analysis method and a distinct specification for modelling the test object. The first analysis module is designed to relay information relating to an ascertained protection requirement to a second analysis module for carrying out a risk analysis for a part of the test object that is located in a second context, a transmission path of a datum for which a protection requirement was ascertained being taken as a basis for automatically determining the further risk analysis during which the protection requirement is meant to be taken into account.

A second device for use in a system has a second analysis module for carrying out a semi-automated or fully automated risk analysis for a part of a test object that is located in a second context in a second analysis context, the second analysis context being delineated by a distinct assessment model or a distinct analysis method and a distinct specification for modelling the test object. The second analysis module is designed to take into account a protection requirement ascertained by a first analysis module when carrying out a risk analysis for a part of the test object that is located in a first context during the risk analysis in the second context.

In the solution, the addition of a modelling operation in which information relating to an ascertained protection requirement is exchanged between the risk analyses permits automation of the resolution of the reciprocal dependencies. In the risk analyses involved, each of the pieces of relayed information can be taken as a basis for adopting the same protection requirement. This obviates the need for iterative, generally manual, synchronization of the risk analyses in different contexts. Since manual implementation and maintenance of the risk analysis by a person skilled in the art can be eliminated, the solution is less complex and susceptible to error than known solutions. In particular, the additional time required for a repetitive storage and checking activity by a person skilled in the art is eliminated.

According to disclosed embodiments, the risk analyses may be carried out by taking account of different specifications. A risk analysis for the part of the test object that is located in a context is carried out in a defined analysis context. The analysis context is delineated by various properties, e.g., a distinct policy or a distinct analysis method, and a distinct specification for modelling the test object According to disclosed embodiments, a transmission path of a datum for which a protection requirement was ascertained is used to determine the further risk analysis during which the protection requirement is meant to be taken into account. Cross-context composition of the context-specific risk analyses can be achieved particularly by considering the flows of information between the considered parts of the test object. These flows of information transport goods worthy of protection, e.g., data, which should be represented in the risk analyses of the parts of the test object. The representation can take place at different abstraction levels if necessary.

According to a feature of the disclosed embodiments, the ascertained protection requirement is taken into account by stipulating a risk-mitigating measure. The stipulation, or implementation, of a suitable risk-mitigating measure ensures that the ascertained protection requirement is factored in.

According to a feature of the disclosed embodiments, information relating to the stipulated risk-mitigating measure is exchanged between the risk analyses. In this way, the measure can now be conversely adopted in the risk analysis that ascertained the original protection requirement. This allows the risk-mitigating effect to be taken into account there too. In particular, there is no need for further balancing of the consistency of assumptions and measures, as no further assumptions need to be made.

According to a feature of the disclosed embodiments, the risk-mitigating measure is stipulated in an automated manner or by way of a manual intervention. By way of example, the risk-mitigating measure can be automatically selected from relevant measure catalogs based on the transmitted protection requirement. This has the advantage that no manual interventions are necessary. Alternatively, the risk-mitigating measure can also be stipulated at the personal discretion of a person skilled in the art, however. In this way, the decision-making authority over the measures taken lies with the competent person skilled in the art.

According to a feature of the disclosed embodiments, a threat to the protection requirement that has been uncovered during the risk analysis in one context is taken into account during the risk analysis in the other context. The reciprocal linking of the risk analyses in the different contexts allows not only the determined protection requirements and the respective risk-mitigating measures but also threats to a protection requirement that have been uncovered in another risk analysis to be taken into account in the risk analysis that is the origin of the ascertainment of protection requirements.

According to a feature of the disclosed embodiments, an ascertained protection requirement is additionally also taken into account during a risk analysis for a part of the test object that is located in a third context. Traceability is also possible over multiple analyses or combinations of analyses, provided that there is uniform identification of the data. An implementation can be provided by any algorithm that is able to identify all loop-free communication paths in a "network" from risk analyses. The protection requirements and the protective measures can then be propagated in or against the direction of communication of the data.

According to a feature of the disclosed embodiments, the first context relates to a transport, a mobile device or an embedded system. By way of example, the second context can relate to a backend or an IT system. The solution can be used in all applications in which risk analyses are carried out on distributed test objects. Examples of these are applications on mobile phones with communication to an IT backend, the communication of industrial installations with IT systems or the communication of embedded systems, e.g., chip cards or the like, with other systems.

To provide a better understanding of the principles of the present, exemplary embodiments are explained in more detail below with reference to the figures. It goes without saying that the disclosed embodiments are not restricted to these exemplary embodiments and that the features described can also be combined or modified without departing from the scope of protection of the disclosed embodiment as defined in the appended claims.

FIG. 1 schematically shows a disclosed method for risk analysis of a distributed test object. The method involves a semi-automated or fully automated risk analysis being carried out 10 for a part of the test object that is located in a first context. By way of example, the first context can relate to a transport, a mobile device or an embedded system. A semi-automated or fully automated risk analysis is also carried out 11 for a part of the test object that is located in a second context. By way of example, the second context can relate to a backend or an IT system. If a protection requirement is now ascertained 12 during one of the risk analyses, information relating to the ascertained 12 protection requirement is exchanged 13 between the risk analyses. In particular, a transmission path of a datum for which a protection requirement was ascertained is used to determine the further risk analysis during which the protection requirement is meant to be taken into account. The ascertained 12 protection requirement can then be taken into account by stipulating 14 a risk-mitigating measure. The risk-mitigating measure can be stipulated e.g., in an automated manner or by way of a manual intervention. Information relating to the stipulated 14 risk-mitigating measure can then be exchanged 15 between the risk analyses. Optionally, a threat to the protection requirement that has been uncovered during the risk analysis in one context is also taken into account during the risk analysis in the other context. An ascertained protection requirement can moreover also additionally be taken into account during a risk analysis for a part of the test object that is located in a third context.

Figures 2, 3:
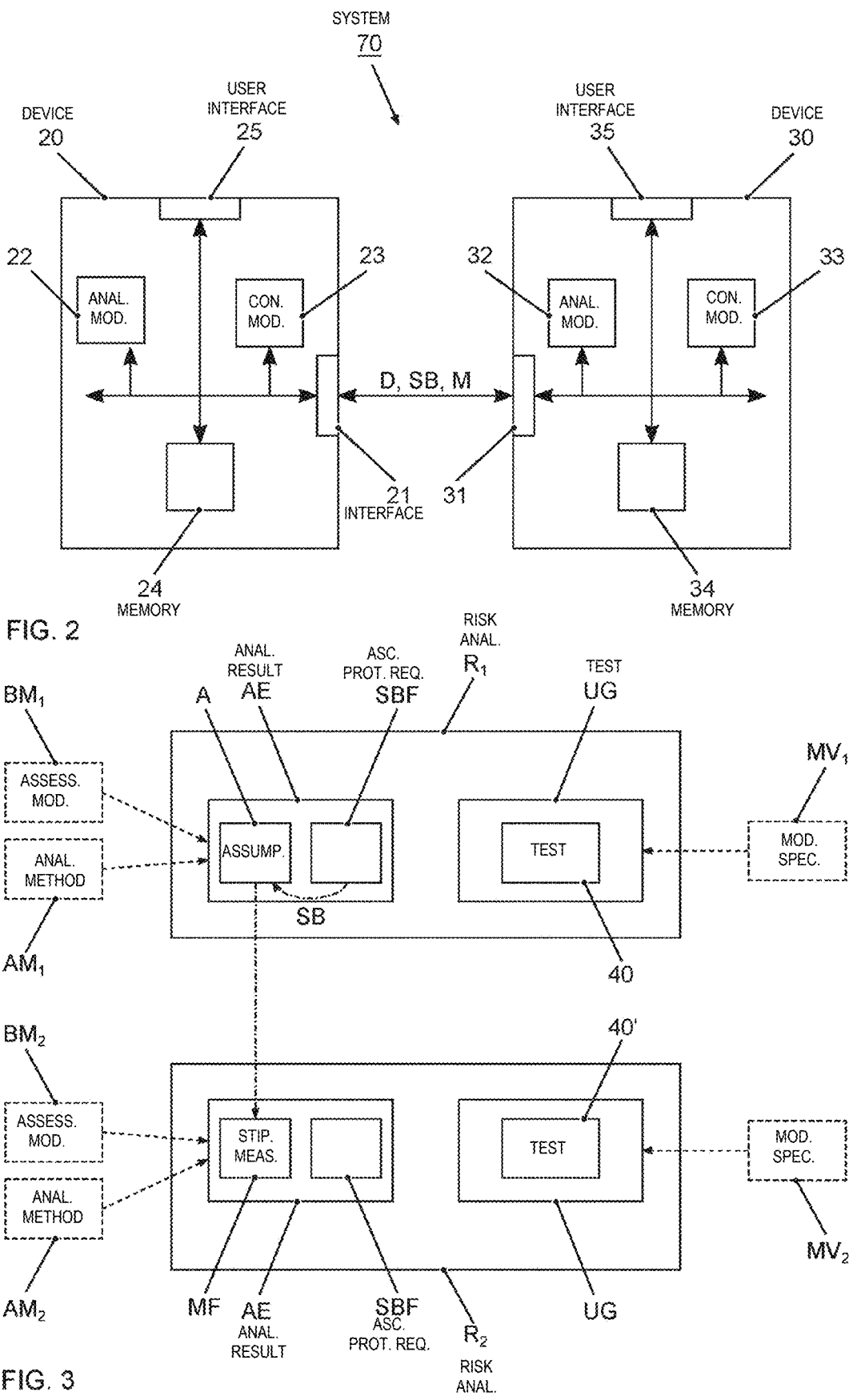
FIG. 2 schematically shows a system for risk analysis of a distributed test object.
FIG. 3 schematically illustrates a known approach for risk analysis of a distributed test object.

FIG. 2 shows a system 70 for risk analysis of a distributed test object. The system 70 in the example encompasses a first device 20 for risk analysis and a second device 30 for risk analysis. The two devices 20, 30 communicate with one another via respective interfaces 21, 31. The first device 20 has a first analysis module 22 for carrying out a semi-automated or fully automated risk analysis for a part of the test object that is located in a first context. By way of example, the first context can relate to a transport, a mobile device or an embedded system. Correspondingly, the second device 30 has a second analysis module 32 for carrying out a semi-automated or fully automated risk analysis for a part of the test object that is located in a second context. By way of example, the second context can relate to a backend or an IT system. The first analysis module 22 and the second analysis module 32 are designed to use the interfaces 21, 31 to exchange information relating to an ascertained protection requirement SB. In particular, a transmission path of a datum for which a protection requirement SB was ascertained is used to determine the further risk analysis during which the protection requirement SB is meant to be taken into account, e.g., the analysis module 22, 32 with which applicable information is meant to be exchanged. The ascertained protection requirement SB can then be taken into account by the analysis modules 22, 32 by stipulating a risk-mitigating measure M. The risk-mitigating measure M can be stipulated e.g., in an automated manner or by way of a manual intervention. The analysis modules 22, 32 can then use the interfaces 21, 31 to exchange information relating to the stipulated risk-mitigating measure M. Optionally, information relating to threats to the protection requirement that have been uncovered during the risk analyses is also exchanged, and so it can be taken into account by the analysis modules 22, 32.

Each of the analysis modules 22, 32 can be controlled by a control module 23, 33. User interfaces 25, 35 can be used to change settings of the analysis modules 22, 32 or of the control modules 23, 33 if necessary. The data arising in each of the devices 20, 30 can be stored in a memory 24, 34 when required, for example, for later evaluation or for use by the components of the device 20, 30. The analysis modules 22, 32 and the control modules 23, 33 can be realized as dedicated hardware, for example, as integrated circuits. Naturally, however, they can also be implemented in a partially or completely combined manner or as software that runs on a suitable processor, for example, on a GPU or a CPU. The interfaces 21, 31 may alternatively also be split into separate inputs and outputs.

The memories 24, 34 of the described devices 20, 30 can have both volatile and nonvolatile memory areas and can encompass a wide variety of storage devices and storage media, for example, hard disks, optical storage media or semiconductor memories.

FIG. 3 illustrates a known approach for risk analysis of a distributed test object UG. A first part 40 of the test object UG is located in a first context, a second part 40' of the test object UG is located in a second context. A risk analysis R1, R2 for the part 40, 40' of the test object UG that is located in a context is carried out in a defined analysis context. The analysis context can be delineated by various properties, e.g., a distinct assessment model BM1, BM2 or a distinct analysis method AM1, AM2, and a distinct specification for modelling MV1, MV2 the test object UG. Cross-context composition of the context-specific analyses R1, R2 is not possible. If the analysis result AE obtained in an ascertainment of protection requirements SBF is a protection requirement SB that can be met only by a protective measure of a part 40, 40' of the distributed test object UG that is located in another context, an assumption A needs to be made about the existence of this measure. The measure can then be taken into account in the relevant subanalysis R1, R2, but must itself be part of the scope of analysis of the subanalysis R1, R2 in the other context. The analysis result AE then needs to be transmitted sequentially to the requesting subanalysis R1, R2. The process needs to be repeated until all reciprocal effects have been taken into account.

Figures 4, 5:
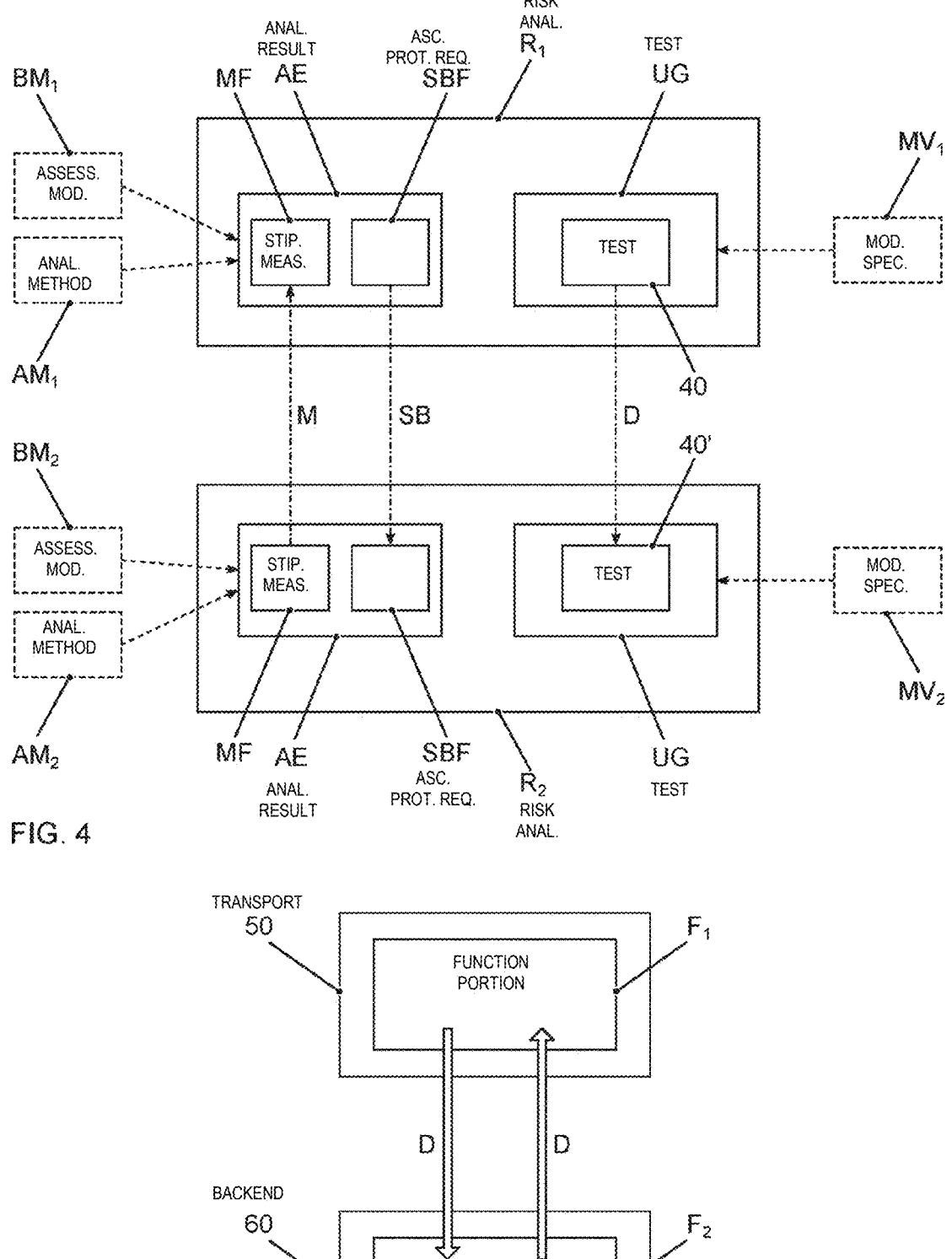
FIG. 4 schematically illustrates an approach for risk analysis of a distributed test object.
FIG. 5 schematically illustrates a test object distributed over a transport and an IT backend.

FIG. 4 illustrates an approach for risk analysis of a distributed test object UG. A first part 40 of the test object UG is located in a first context, a second part 40' of the test object UG is located in a second context. A risk analysis R1, R2 for the part 40, 40' of the test object UG that is located in a context is carried out in a semi-automated or fully automated manner in a defined analysis context. As before, the analysis context is delineated by various properties, e.g., a distinct assessment model BM1, BM2 or a distinct analysis method AM1, AM2, and a distinct specification for modelling MV1, MV2 the test object UG. Cross-context composition of the context-specific analyses R1, R2 is achieved by considering the flows of information between the considered parts 40, 40' of the test object UG. These flows of information transport goods worthy of protection, e.g., data D, which must be represented in the analyses R1, R2 of the parts 40, 40' of the test object UG. The protection requirement SB determined as the analysis result AE in an ascertainment of protection requirements SBF and the possibly resulting risk-mitigating measure M can be reciprocally taken into account across contexts by tracking the flow of information independently of the modelling of the parts 40, 40' of the distributed test object UG. In this case, the subanalyses R1, R2 can be carried out at the same time and the analysis results AE can be reciprocally taken into account in an assisted or automated manner.

An exemplary embodiment of a solution will be described hereinbelow with reference to FIG. 5 to FIG. 9 using a specific example of application.

FIG. 5 illustrates a test object that is distributed over a transport 50 and an IT backend 60. In the example shown, a function for user registration in the transport 50 is meant to be considered. This function has a portion F1 in the transport 50 for carrying out the registration and storing the registered user and a portion F2 in the IT backend 60 that is responsible for user management and user authentication. The transport 50 and the backend 60 communicate via a mobile radio network for this purpose. Separate risk analyses in respect of cyber security need to be carried out for the two portions F1, F2 of the function, e.g., in the transport 50 and in the backend 60. Between the function portions there are two signals containing two relayed data D, the registration data from the transport 50 and the result of the user authentication from the backend 60.

The problem arises due to the fact that the risk analyses are carried out taking account of different specifications relating to assessment model, analysis method, modelling specification, e.g., different analysis contexts are present. This prevents the risk analysis of the two function portions from being carried out in one pass, e.g., in one tool or in an overall risk analysis. The two portions have to be analyzed separately owing to the different specifications, or premises.

It will be assumed that it has been ascertained in the respective analysis that a) the user data from the f transport 50 must be dealt with confidentially and b) the result of the authentication must be authentic. Taking account of the respective damage scenario, specifically a) breach of the privacy of the user and b) illegitimate registration in the transport 50, there is a risk that requires mitigation, e.g., a risk response through lessening, depending on the circumstances by way of suitable precautionary measures. However, these precautionary measures cannot be unilaterally defined and implemented in all cases. If the result of the authentication is received from the transport 50, the transport 50 cannot do anything to guarantee the required authenticity. This needs to be guaranteed by the backend 60.

Normally, therefore, assumptions about the communication partner are used. A first assumption, for instance, is that the transport 50 ensures the confidentiality of the user data during storage, processing and transmission. A second assumption, for instance, is that the backend 60 ensures the authenticity of the result of the authentication during processing and transmission.

These assumptions about the communication partner yield functional demands. A functional demand on the transport 50 is, for instance, that the transport 50 stores the user data confidentially in a secure memory area by suitable encryption and transmits the data via a channel that permits confidential transmission, e.g., TLS (Transport Layer Security). A functional demand on the backend 60 is, for instance, that the backend 60 transmits the result of the authentication via a channel that permits authentic transmission, e.g., TLS. These functional demands must in turn be taken into account in the analysis by the respective remote site. Carrying out the analyses with reciprocal dependency is, therefore, a manual and above all iterative process in known approaches, since the assumptions must be transmitted after (first) analysis has taken place, and the functional implementation must then in turn be taken into account in a (second) analysis.

Figures 6, 7:
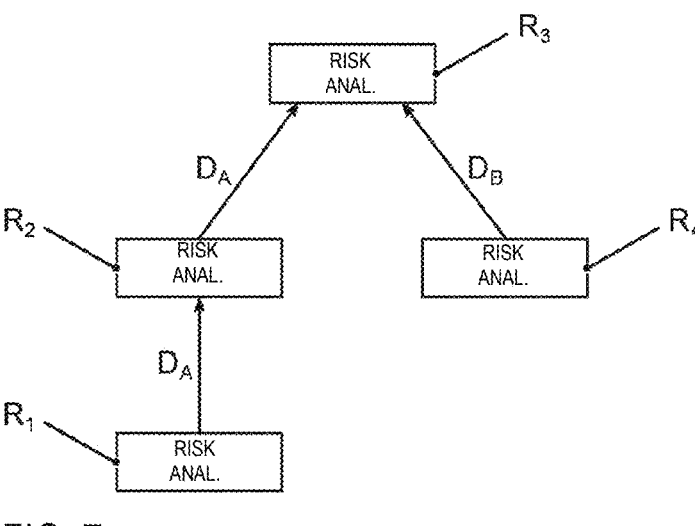
FIG. 6 schematically illustrates a risk analysis of the test object from FIG. 5.
FIG. 7 schematically illustrates a first phase of a risk analysis of a test object that extends to four contexts.

FIG. 6 illustrates a risk analysis of the test object UG from FIG. 5. In this case too, the differing analysis contexts mean that two analyses are carried out, e.g., a first risk analysis R1 in the context "transport" 50 and a second risk analysis R2 in the context "IT backend" 60.

For the risk analysis R1 in the context "transport" 50 it is possible to use an assessment model BM1 for the context "embedded system", e.g., an assessment according to guidelines of the UNECE (United Nations Economic Commission for Europe). Accordingly, an analysis method AM1 for the context "embedded system", e.g., a method according to guidelines of the UNECE, and a modelling specification MV1 for the context "embedded system" can be used. The modelling specification MV1 may also be part of the external guidelines, as depicted in FIG. 6.

For the risk analysis R2 in the context "IT backend" 60 it is possible to use an assessment model BM2 for the context "IT system", e.g., an analysis according to guidelines of local institutions such as the BSI (Federal Office for Information Security). Accordingly, an analysis method AM2 for the context "IT system", e.g., a method according to BSI guidelines, and a modelling specification MV2 for the context "IT system" can be used. As is also the case of the risk analysis R1, the modelling specification MV2 may be part of the external guidelines.

For data D that are interchanged between the transport 50 and the backend 60, however, the respective data origin is annotated, or taken into account. Between the analyses R1, R2 that are carried out, uniform identification of transmitted data D is then permitted, by way of either alignment or association. This can be done independently of the analysis context and in particular the respective modelling specification MV1, MV2. The modelling of the test object UG on the part of the transport 50 and the backend 60 is thus complemented by just one operation.

If the analysis result AE now ascertained in an ascertainment of protection requirements SBF is a protection requirement SB for a datum D, e.g., in the case of the transport 50 an authenticity of the authentication result, it is possible to automatically track the ways in which the datum D is transmitted, here that is to say from the backend 60, and to adopt the same protection requirement SB in the analysis R1, R2 of the transmission partner. A risk-mitigating measure M can then be stipulated in the analysis R1, R2 of the transmission partner, e.g., an authentic transmission, which can be automatically selected from relevant measure catalogs based on the transmitted protection requirement SB or is stipulated at personal discretion.

The measure M, here that is to say the authentic transmission of the datum, can now in turn be conversely adopted in the analysis R1, R2 that ascertained the original protection requirement SB, and the risk-mitigating effect can be taken into account there too. In particular, there is no need for further balancing of the consistency of assumptions and measures, as no further assumptions need to be made.

Traceability is also possible over multiple analyses R1, R2 or combinations of analyses, provided that there is uniform identification of the data D. An implementation can be provided by any algorithm that is able to identify all loop-free communication paths in a "network" from risk analyses R1, R2. The protection requirements SB and the protective measures M can then be propagated in or against the direction of communication of the data D.

In the examples in FIG. 5 and FIG. 6, the protection requirement SB of a datum D is ascertained by that risk analysis R1, R2 that sends the datum D. However, the protection requirement SB can just as well be ascertained by that risk analysis R1, R2 that receives the datum D.

FIG. 7 illustrates a first phase of a risk analysis of a test object that extends to four contexts. Four associated risk analyses RA1-RA4 are carried out for the four contexts. In this example, the protection requirement is ascertained by the receiving party in each case. In the example depicted, a first risk analysis RA1 of a part of the test object in a first context results in it being ascertained that a first datum DA is relayed to a part of the test object in a second context. The result of the risk analysis RA2 in the second context is moreover that the first datum DA is relayed to a part of the test object in a third context, for which a third risk analysis RA3 is carried out. A fourth risk analysis RA4 of a part of the test object in a fourth context moreover results in it being ascertained that a second datum DB is relayed to the part of the test object in the third context.

Figures 8, 9:
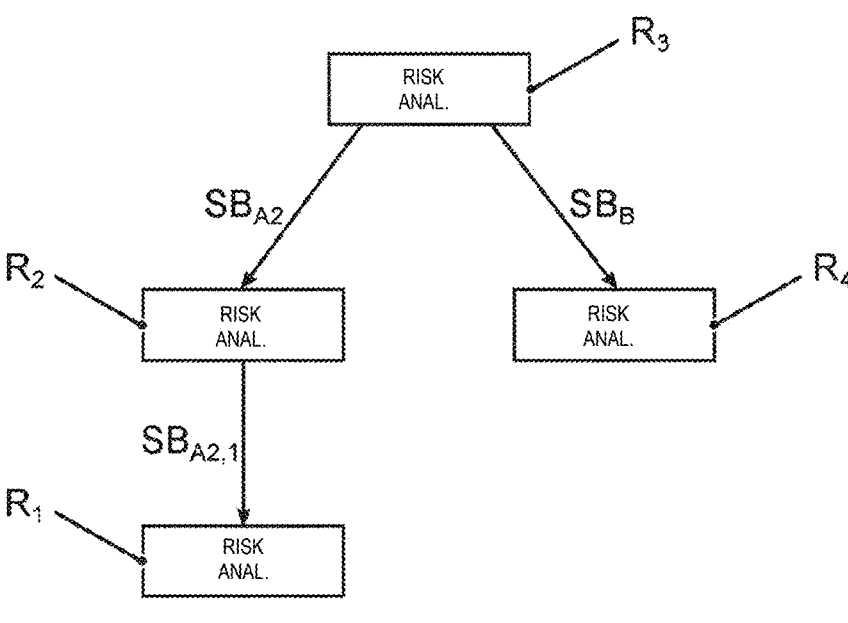
FIG. 8 schematically illustrates a second phase of a risk analysis of a test object that extends to four contexts.
FIG. 9 schematically illustrates a third phase of a risk analysis of a test object that extends to four contexts.

FIG. 8 illustrates a second phase of the risk analysis. The fourth risk analysis RA4 relays a protection requirement SBB ascertained for the second datum DB to the third risk analysis RA3. Moreover, a protection requirement SBA2 ascertained for the first datum DA is relayed to the second risk analysis RA2. The second risk analysis RA2 takes the relayed protection requirement SBA2 as a basis for determining an overall resultant protection requirement SBA2,1 and relays protection requirement to the first risk analysis RA1.

FIG. 9 illustrates a third phase of the risk analysis. In response to the ascertained protection requirement SBA2,1, the first risk analysis RA1 stipulates a suitable risk-mitigating measure MA1 and relays corresponding information to the second risk analysis RA2. Accordingly, the second risk analysis RA2 responds to the ascertained protection requirement SBA2 by stipulating a suitable risk-mitigating measure MA2 and relays the corresponding information to the third risk analysis RA3. The fourth risk analysis RA4 responds to the ascertained protection requirement SBB by stipulating a suitable risk-mitigating measure MB and relays the corresponding information to the third risk analysis RA3. Thus, none of the risk analyses RA1-RA4 are reliant on making assumptions about the respective communication partners.

LIST OF REFERENCE SIGNS

10 carry out a risk analysis in a first context
11 carry out a risk analysis in a second context
12 ascertain a protection requirement
13 exchange information relating to the protection requirement
14 stipulate a risk-mitigating measure
15 exchange information relating to the stipulated measure
20 device
21 interface
22 analysis module
23 control module
24 memory
25 user interface
30 device
31 interface
32 analysis module
33 control module
34 memory
35 user interface

40, 40' test object
50 transport
60 backend
70 system
A assumption
AE analysis result
$AM_1$, $AM_2$ analysis method
$BM_1$, $BM_2$ assessment model
D, $D_A$, $D_B$ datum
$F_1$, $F_2$ function portion
M, $M_{A1}$, risk-mitigating measure
$M_{A2}$, $M_B$
MF stipulation of measures
$MV_1$, $MV_2$ modelling specification
$RA_1$-$RA_4$ risk analysis
SB, $SB_B$ protection requirement
$SB_{A2}$, $SB_{A2,1}$
SBF ascertainment of protection requirements
UG test object

The invention claimed is:

1. A method for performing cyber security risk analysis of a distributed test object that includes a plurality of distributed test object parts, the method comprising:

performing a semi-automated, or fully automated, first risk analysis for a first one of the plurality of distributed test object parts located in a first context in a first analysis context, the first analysis context being delineated from other analysis contexts of a plurality of analysis contexts by a first distinct assessment model or a first distinct analysis method and a first distinct specification for modelling the test object, wherein the first context relates to a transport, a mobile device or an embedded system;

performing a semi-automated, or fully automated, second risk analysis for a second one of the plurality of distributed test object parts located in a second context in a second analysis context, the second analysis context being delineated by a second distinct assessment model or a second distinct analysis method and a second distinct specification for modelling the test object, wherein the second context relates to a backend or information technology system;

exchanging information relating to an ascertained protection requirement between the first and second risk analyses; and automatically performing further risk analyses while the ascertained protection requirement is to be taken into account based on a transmission path of a datum for the ascertained protection requirement, wherein the further cyber security risk analyses are performed in the first and second contexts by interchanging data between the first and second contexts, wherein respective data origins are annotated during analysis to provide uniform identification of transmitted data by way of either alignment or association independently of analysis context and modelling specification such that modelling of the test object part in the transport and the backend is completed in a single operation, wherein a threat to the protection requirement identified during the risk analysis in one of the first and second contexts is taken into account during the risk analysis in the other of the first and second contexts to provide reciprocal linking of the risk analyses in the different contexts that enables threats to a protection requirement that have been identified in and taken into consideration across contexts reciprocally, wherein in response to identification of the threat to the protection requirement during the one of the first and second risk analyses is taken into account during the other of the first and second risk analyses, and wherein an ascertained protection requirement is taken into account during a third risk analysis for a part of the test object that is located in a third context.

2. The method of claim 1, wherein the ascertained protection requirement is taken into account by stipulating a risk-mitigating measure.

3. The method of claim 2, wherein information relating to the stipulated risk-mitigating measure is exchanged between risk analyses.

4. The method of claim 3, wherein the risk-mitigating measure is stipulated in an automated manner or by way of a manual intervention.

5. A non-transitory computer readable medium including computer program containing instructions that, when executed by a computer, cause the computer to perform the risk analysis method of claim 1.

6. A system for performing cyber security risk analysis of a distributed test object that includes a plurality of distributed test object parts, having:

first analysis circuitry for performing a semi-automated or fully automated risk analysis for a first one of the plurality of distributed test object parts located in a first context in a first analysis context, the first analysis context being delineated from other analysis contexts of a plurality of analysis contexts by a first distinct assessment model or a first distinct analysis method and a first distinct specification for modelling the test object, wherein the first context relates to a transport, a mobile device or an embedded system; and second analysis circuitry for performing a semi-automated or fully automated risk analysis for a second one of the plurality of distributed test object parts located in a second context in a second analysis context, the second analysis context being delineated by a second distinct assessment model or a second distinct analysis method and a second distinct specification for modelling the test object, wherein the second context relates to a backend or information technology system, wherein the first analysis circuitry and the second analysis circuitry being configured to exchange information relating to an ascertained protection requirement, wherein automatic performance of further risk analyses while the ascertained protection requirement is to be taken into account is based on a transmission path of a datum for the ascertained protection requirement, wherein the further cyber security risk analyses are performed in the first and second contexts by interchanging data between the first and second contexts, wherein respective data origins are annotated during analysis to provide uniform identification of transmitted data by way of either alignment or association independently of analysis context and modelling specification such that modelling of the test object part in the transport and the backend is completed in a single operation, wherein a threat to the protection requirement identified during the risk analysis in one of the first and second contexts is taken into account during the risk analysis in the other of the first and second contexts to provide reciprocal linking of the risk analyses in the different contexts that enables threats to a protection requirement that have been identified in and taken into consideration across contexts reciprocally, wherein in response to identification of the threat to the protection requirement during the one of the first and second risk analyses is taken into account during the other of the first and second risk analyses, and wherein an ascertained protection requirement is taken into account during a third risk analysis for a part of the test object that is located in a third context.

7. The system of claim 6, wherein the first analysis circuitry is further configured to relay information relating to the ascertained protection requirement to the second analysis circuitry for carrying out risk analysis for the part of the test object that is located in the second context.

8. The system of claim 6, wherein the second analysis circuitry is further configured to take into account the protection requirement ascertained by the first analysis circuitry in the second context.

9. The system of claim 6, wherein the first analysis circuitry is part of a first analysis device and the second analysis circuitry is part of a second analysis device both included in the system and communicating to perform risk analysis of a distributed test object, wherein the system further comprises first and second interfaces for the respective first and second devices for communication with one another, wherein the first analysis circuitry and the second analysis circuitry are configured to use the first and second device interfaces to exchange information relating to an ascertained protection requirement.

10. The system of claim 9, wherein the transmission path of the datum for the ascertained protection requirement is used to perform further risk analysis while the ascertained protection requirement is to be taken into account.

11. The system of claim 9, wherein the ascertained protection requirement is taken into account by the first and second analysis circuitry stipulating a risk-mitigating measure in an automated manner or by manual intervention.

12. The system of claim 9, wherein each of the first and second analysis devices further comprise a controller configured to control operation of the first and second analysis circuitry.

13. The system of claim 12, wherein settings of the first and second analysis circuitry are changeable by the user interfaces or the controllers for the first and second analysis devices.

* * * * *